Patented Oct. 26, 1937

2,097,274

UNITED STATES PATENT OFFICE 2,097,274

MOLDS USED IN THE PREPARATION OF SYNTHETIC RESINS

Reuben T. Fields, Arlington, N. J., assignor, by mesne assignments, to E. I. du Pont de Nemours & Company, Wilmington, Del., a corporation of Delaware No Drawing. Application April 30, 1936, Serial No. 77,173

5 Claims. (Cl. 18—47)

This invention relates to molds made of a special alloy and, more particularly, to the preparation of synthetic resins in various shapes by polymerizing liquid polymerizable unsaturated organic compounds in such molds.

Heretofore, the preparation of so-called "cast" or "turnery" resins in definite shapes has been largely accomplished through the use of lead molds. These lead molds are generally made by dipping a steel master mold into molten lead and stripping the resulting solidified layer of lead, which forms the mold, from the master mold. These molds are customarily used only once since they are almost inevitably damaged during the removal of the finished resin casting from them, the lead being then melted for re-use.

In recent years the production of cast and turnery resins from various liquid polymerizable unsaturated organic compounds, such as the various esters of methacrylic acid and acrylic acid, has become of increasing importance. Many of these polymerizable compounds give, upon polymerization, solid bodies of amazing clarity and sparkle which greatly adds to their attractiveness and value. But in the commercial production of these cast and turnery resins it has been found that the contact of the liquid undergoing polymerization with the surfaces of the ordinary lead molds distinctly impairs the clarity and sparkle of the resins. This is particularly true when benzoyl peroxide, probably the most frequently used polymerization catalyst, and/or water is present. The haze in the finished resin is sometimes referred to in the art as "lead haze."

An object of the present invention is to provide a means of avoiding the formation of the so-called lead haze during the polymerization of these liquid polymerizable unsaturated organic compounds in lead molds. A further object is to provide a new lead alloy adapted for use in the manufacture of the molds and which will not cause lead haze. A further object is to provide such an alloy which is so similar in working qualities to lead that there need be no alteration of the technique of making the molds, nor of the conditions under which polymerization of the organic compounds is carried out. Other objects will be apparent from the description of the invention given hereinafter.

The above objects are accomplished according to the present invention by conducting the polymerization of the unsaturated organic compound in molds made of an alloy of lead with small proportions of tin. The composition of the alloy would preferably be 99.5–93 parts, by weight, of lead to 0.5–7 parts, by weight, of tin while, more specifically, the alloy would be composed of 99–97 parts, by weight, of lead 1–3 parts, by weight, of tin.

It has been unexpectedly discovered that the addition of relatively small percentages of tin to the lead from which the molds are made, prevents the development of haze and, further, that the amounts of tin required for the purpose are sufficiently small not to necessitate any substantial deviation from the established technique of forming such molds by dipping and of using such molds for the casting of resins.

The percentage of tin in the alloy to prevent the formation of haze in the resin being polymerized will vary somewhat depending upon the conditions of the individual case, a proportion of 0.5% being sufficient in many instances, whereas as much as 5.0% is necessary in a few instances. On the other hand, in order that the addition of the tin shall not seriously alter the working qualities of the lead, the amount of tin to be used will not generally exceed about 7%; higher percentages of tin are perfectly satisfactory as regards the prevention of haze but have an undesirable effect on the working qualities of the lead and hence would not ordinarily be used.

The following example specifically illustrates the invention as applied to the polymerization of methyl methacrylate; all parts and proportions throughout the specification are given by weight:—

*Example 1*

A steel master mold of cylindrical shape, 10" long with a maximum diameter of 1" and a taper of 0.05" in diameter per inch of length, is immersed into a molten alloy consisting of 98% lead and 2% tin maintained at about 360° C. It is withdrawn after about three seconds and carries with it a solidified layer of the alloy which is stripped from the master mold and forms the mold for casting a rod of synthetic resin.

Into the mold thus formed is poured a syrup consisting of methyl methacrylate produced by heating monomeric methyl methacrylate for two hours at 78° C. and then adding to it 0.04% of benzoyl peroxide.

The loaded mold is placed in an autoclave equipped with a stuffing box and means for lowering the mold at the rate of 1-½" per hour into a heated reservoir of non-volatile liquid contained within the autoclave. The temperature of this liquid is 75-80° C. Pressure of 125 pounds per square inch, furnished by nitrogen gas, is applied to the autoclave and the mold is lowered until it is nearly submerged. It is then allowed to stand for 2-5 hours longer. The mold is thereafter raised, the autoclave opened, and the mold chilled. The rod of polymerized methyl methacrylate thus formed is then knocked out and found to be of exceptional clarity and sparkle.

The same methyl methacrylate syrup polymerized under the same conditions and in a similar mold made of lead, instead of the lead-tin alloy, is distinctly hazy.

The above example is merely given to illustrate one specific method of polymerizing the liquid polymerizable unsaturated organic compounds of which methyl methacrylate is an example. Obviously the present invention broadly relates to the use of this new alloy in molds generally.

Other unsaturated organic compounds frequently used in the formation of cast and turnery resins include ethyl, butyl, phenyl, and glycol methacrylates, as well as the corresponding acrylates and other alkacrylates. As far as known, the alloy of the present invention will prevent the formation of lead haze regardless of the specific unsaturated organic compound which is being polymerized.

The proportion of tin added to the lead, according to the present invention, does not affect the melting point of the lead sufficiently to necessitate any material alteration in the technique of forming the molds by immersion of the steel master mold.

While pure lead could be employed in making the alloy of the present invention, it should be understood that it would be more usual to employ the ordinary commercial lead, a grade of which adapted for this purpose is virgin blue lead, of which a typical analysis runs as follows:

| | Percent |
|---|---|
| Bismuth | 0.09 |
| Antimony | 0.001 |
| Zinc | 0.0006 |
| Iron | 0.0002 |
| Arsenic | none |
| Tin | none |
| Copper | 0.0005 |
| Silver | 0.0004 |
| Lead | balance |

The tin is most conveniently available in the form of "soft solder", of which a typical composition is 50% lead and 50% tin. The amount of tin introduced into the alloy is based on the actual tin content of the "soft solder" rather than the total amount of soft solder added.

The invention has been particularly described in connection with the use of a mold formed by the immersion of a master mold into molten metal since this is the common way of making such molds but the mold may be made by any other method available, such as by extrusion in the manner of making lead cable covering, or by stamping as in the manner of making tubes for toilet preparations, or by ordinary methods of casting or die casting.

The following examples illustrate other specific alloys of lead and tin suitable for use in making molds according to the present invention:

*Example 2*

| | Percent |
|---|---|
| Lead | 95 |
| Tin | 5 |

*Example 3*

| | Percent |
|---|---|
| Lead | 99.4 |
| Tin | 0.6 |

*Example 4*

| | Percent |
|---|---|
| Lead | 93.5 |
| Tin | 6.5 |

*Example 5*

| | Percent |
|---|---|
| Lead | 99 |
| Tin | 1 |

*Example 6*

| | Percent |
|---|---|
| Lead | 97 |
| Tin | 3 |

It will be understood by those skilled in the art that a lead alloy containing as little as 0.5% tin, although not necessarily preventing lead haze under every possible condition of polymerization, will reduce the lead haze and thus possesses utility as, in some instances, complete absence of lead haze in the finished product is not necessary. On the other hand, a lead alloy containing as much as 5% tin will completely prevent formation of lead haze even under the severest conditions of polymerization, as far as applicant can ascertain.

The amount of tin added to the lead in making the alloy of the present invention may be adjusted to meet the requirements of particular cases. Where the tendency to formation of lead haze is strong, particularly when the conditions of polymerization involve a prolonged contact of the material with the lead and the presence of a comparatively high percentage of catalyst, it may be desirable to use a larger proportion than would ordinarily be needed when the tendency toward the development of the lead haze is less pronounced. It has been found that the lead haze, which apparently is caused by the formation of some unidentified lead compound in the resin, is dependent upon the nature and amount of catalyst employed, the moisture content of the mixture undergoing polymerization and the temperature obtaining, and the duration of that part of the reaction time during which the liquid retains some degree of mobility whereby fresh contact with the mold wall may be established. The oxygen-yielding catalysts, as typified by benzoyl peroxide, appear to be especially active in the formation of lead haze.

Molds employing the alloy of the present invention are adapted for use in the preparation of cast and turnery resins the utility of said molds obviously being far greater where it is intended to produce transparent resins in which the formation of lead haze would be objectionable.

An advantage of the present invention is that it provides a means of eliminating the highly objectionable lead haze in cast and turnery resins without in any material way upsetting the technique of producing such resins heretofore in use. A further advantage is that there is no appreciable increase in cost in making molds of the herein disclosed alloy as compared to making them of lead, nor are there any disadvantages in the use of this alloy which would tend to offset the obvious advantages it possesses. Those skilled in the art will readily understand that, by the use of the alloy of the present invention, the necessity of laboriously adjusting the conditions of polymerization including temperature, catalyst and time, and of reducing the normal moisture content of the monomer, with a view to mitigating as far as possible conditions conducive to the production of lead haze, can all be eliminated.

As many apparently widely different embodiments of this invention may be made without departing from the spirit and scope thereof, it is to be understood that the invention is not limited to the specific embodiments thereof except as defined in the appended claims.

I claim:

1. A mold for the polymerization of liquid polymerizable unsaturated organic compounds from the group consisting of esters of acrylic and alkacrylic acids, said mold being made of an alloy consisting of 99.5–93 parts of lead and 0.5–7 parts of tin.

2. A mold for the polymerization of liquid polymerizable unsaturated organic compounds from the group consisting of esters of acrylic and alkacrylic acids, said mold being made of an alloy consisting of 99–97 parts of lead and 1–3 parts of tin.

3. In the preparation of synthetic resins by polymerization of monomeric methyl methacrylate, the step of effecting said polymerization in a mold of an alloy consisting of 99.5–93 parts of lead and 0.5–7 parts of tin.

4. In the preparation of synthetic resins by polymerization of monomeric methyl methacrylate, the step of effecting said polymerization in a mold of an alloy consisting of 99–97 parts of lead and 1–3 parts of tin.

5. In the preparation of synthetic resins by polymerization of a liquid polymerizable unsaturated organic compound from the group consisting of esters of acrylic and alkacrylic acids, the step of effecting said polymerization in a mold of an alloy consisting of 99.5–93 parts of lead and 0.5–7 parts of tin.

REUBEN T. FIELDS.